United States Patent [19]

Tiedemann et al.

[11] 4,364,917

[45] Dec. 21, 1982

[54] CONTINUOUS PROCESS FOR MAKING CALCIUM HYPOCHLORITE

[75] Inventors: Herman H. Tiedemann, Texas City, Tex.; Gilbert Thibault, Coquitlam; Joseph G. J. Laberge, Oakville, both of Canada

[73] Assignee: C-I-L Inc., North York, Canada

[21] Appl. No.: 352,543

[22] Filed: Feb. 26, 1982

[30] Foreign Application Priorty Date

Mar. 9, 1981 [CA] Canada ............................ 372583

[51] Int. Cl.³ .............................................. C01B 11/06
[52] U.S. Cl. ................................ 423/474; 422/194
[58] Field of Search ............ 423/473, 474, 659; 210/752, 754; 422/194

[56] References Cited

U.S. PATENT DOCUMENTS

| | | | |
|---|---|---|---|
| 1,884,200 | 10/1932 | Philipp | 423/474 |
| 3,241,912 | 3/1966 | Nicolaisen | 423/474 |
| 3,495,952 | 2/1970 | Ulbrecht | 422/194 |
| 3,998,714 | 12/1976 | Armstrong | 210/752 |
| 4,010,244 | 3/1977 | King | 423/474 |
| 4,017,592 | 4/1977 | Penard | 423/659 |

FOREIGN PATENT DOCUMENTS

54-39383  3/1979  Japan .............................. 422/194

Primary Examiner—Brian E. Hearn
Attorney, Agent, or Firm—C. Brian Barlow

[57] ABSTRACT

A process for the continuous preparation of a slurry of calcium hypochlorite wherein a solution of sodium hydroxide is fed to one end of an elongated tubular reaction and a calcium hydroxide slurry and chlorine are introduced through a number of injection sites along the length of the reactor. The redox potential of the reaction mixture at any injection site must not be inferior to that at the immediately preceding site and must be in the range 900 to 950 mV at the exit end of the reactor. The process permits easy control of the reaction temperature and of the viscosity of the reaction mixture.

4 Claims, 1 Drawing Figure

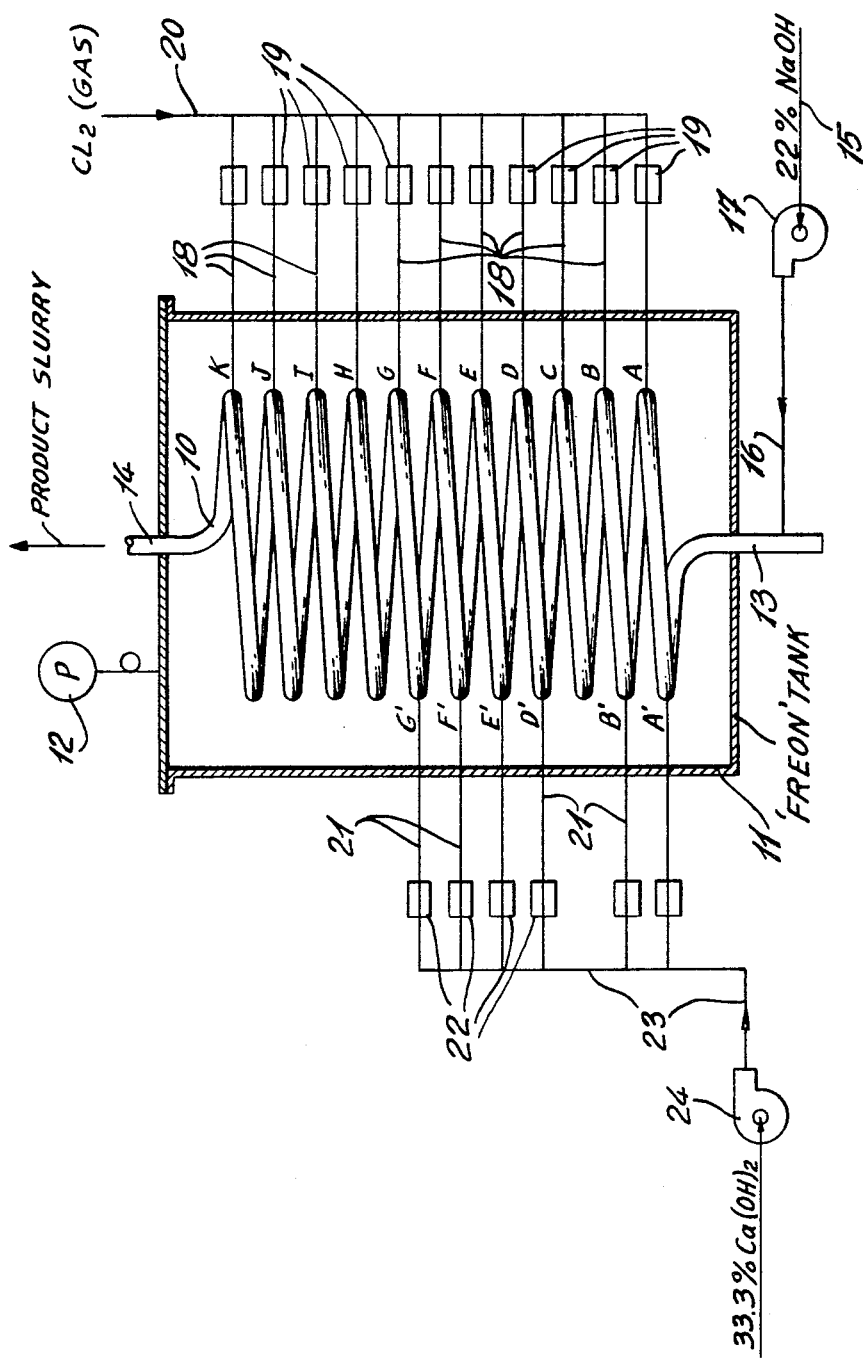

CONTINUOUS PROCESS FOR MAKING CALCIUM HYPOCHLORITE

This invention relates to improvements in the manufacture of calcium hypochlorite.

Calcium hypochlorite is manufactured commercially by passing chlorine through an aqueous solution of sodium hydroxide containing suspended particles of calcium hydroxide. The three reagents interreact according to the following well known equations:

$$2Ca(OH)_2 + 2Cl_2 \rightarrow Ca(OCl)_2 + CaCl_2 + 2H_2O$$

$$4NaOH + Cl_2 \rightarrow 2NaOCl + 2NaCl + 2H_2O$$

$$CaCl_2 + 2NaOCl \rightarrow Ca(OCl)_2 + 2NaCl$$

which can be summed up in the overall equation $$Ca(OH)_2 + 2NaOH + 2Cl_2 \; Ca(OCl)_2 + NaCl + 2H_2O$$

Conventionally the above reactions are carried out in a batch process wherein chlorine gas is passed into a slurry of lime and caustic soda in water. When the reaction is complete the product is separated from the mother liquor and dried. However the batch process presents several serious difficulties especially with regard to control of viscosity of the reaction mixtures and control of reaction temperature. In order to alleviate these difficulties it is proposed in U.S. Pat. No. 3,956,471 issued on 11th May, 1976 to Brian James Pullman et al. to modify the batch process for continuous operation.

The modified process according to the above patent consists of continuously pumping into a first stirred reactor an aqueous slurry of calcium hydroxide and sodium hydroxide optionally partially chlorinated and simultaneously passing chlorine gas into the reaction mixture at such a rate that the redox potential is in the range from 650–850 mV and allowing the contents of the first reactor to overflow continuously into a second stirred reactor and simultaneously passing chlorine gas into the second reactor at such a rate that the redox potential is in the range from 650–950 mV and allowing the contents of the second reactor to overflow and be removed as product. Although this modified process does constitute a certain improvement over the batch process, it has proved not to be completely satisfactory. It is not a truly continuous process but rather a continuous batch type operation which still involves the relatively high cost of batch reactors, mixing and heat transfer problems, etc.

It is the principal object of this invention to provide a process for making calcium hypochlorite by interreaction of calcium hydroxide, caustic soda and chlorine in a truly continuous operation wherein viscosity of reaction mixtures and reaction temperature are more easily controlled than was heretofore possible. This and other objects and advantages of the invention will become further apparent from the following description.

Thus the invention provides a process for the continuous preparation of calcium hypochlorite slurry which comprises:

(a) continuously feeding an aqueous solution of sodium hydroxide to one end of a stirred tubular reactor;

(b) at each one of a number of injection sites axially spaced along the length of the tubular reactor continuously and separately injecting chlorine and an aqueous slurry of calcium hydroxide at such rates and molar ratio to each other that the redox potential of the resulting reaction mixture at any one injection site remains constant at a value not lower than that at the immediately proceeding injection site, said rates of injection and molar ratio being such at the last injection site that the redox potential of the reaction mixture at that site is in the range from 900 to 950 mV; and (c) removing the produced slurry of calcium hypochlorite from the other end of the tubular reactor; the temperature of the reaction mixture throughout the process being maintained within the range from 10° C. to 30° C.

As tubular reactor, there may be used any elongated tube made of or internally coated with a material that is resistant to attack by the reactants and products of reaction. Preferably the reactor will be a continuous titanium tube equipped with suitable agitating means such as Teflon (Trademark) static mixers. Substantially regularly spaced along the length of the tube there will be a number of injection sites each of which will comprise a pair of inlet ports for controlled injection into the tube of chlorine and calcium hydroxide slurry.

The temperature of the reactants in the tube throughout the reaction may be controlled by any convenient method. Preferably the temperature is controlled by evaporative cooling. In a preferred embodiment the reactor tube is immersed in liquid refrigerant. e.g. Freon (trademark) so that the reaction temperature can be maintained by pressure control over the refrigerant.

As indicated above the sodium hydroxide is fed to one end of the tubular reactor in the form of an aqueous solution. Conveniently the sodium hydroxide may be supplied as a concentrated solution as normally obtained from caustic soda-chlorine manufacturing operations.

The rates of addition and molar ratio of the reactants chlorine and calcium hydroxide injected into the tubular reactor at each injection site are critical only to the extent that they must be such that the redox potential of the reaction mixture at any one injection site is maintained constant at a level not lower than that at the immediately preceding site. At the last injection site such rates and molar ratio must be such that the redox potential will be in the range of 900 to 950 mV.

Calcium hydroxide is injected into the reactor in the form of an aqueous slurry. In general sufficient water should be used to produce a slurry which is stirrable and pumpable. A slurry containing 20%–35% by weight of calcium hydroxide is suitable.

Chlorine may be injected either as gas or as liquid. The number of injection sites should be high enough to allow control of the viscosity of the reaction mixture. It has been found that there should be at least ten such sites. In fact there may be as many as is technically and economically practicable.

Monitoring of the redox potential at the different injection sites may be made by any suitable means for instance, oxido-reduction potential probes may be installed in the reactor tube for progressive monitoring. Chlorine and calcium hydroxide are then injected at the various sites under computer control as dictated by the probes.

The product continuously withdrawn from the exit end of the reactor comprises an aqueous slurry of calcium hypochlorite and the calcium hypochlorite may be separated from the mother liquor and dried by any convenient method known in the art.

The product produced by the present continuous process is equal to or superior in strength and yield to the batch process. This process also gives reaction slurries which settle faster than, and are superior in filtration rate to, those of the batch process.

The invention is illustrated by, but by no means limited to the following example.

EXAMPLE

Brief Description of the Drawing

The following example which provides one way of carrying out the process of the invention is to be read in conjunction with the attached drawing which illustrates an embodiment of an apparatus especially adapted to carry out the process.

Referring to the drawing, there is shown a one inch titanium tube 10 approximately eighty feet long and wound as a twenty three inch diameter coil center to center. The coiled portion of tube 10 is fully enclosed in a closed tank 11 containing a boiling liquid refrigerant such as 'Freon' and equipped with a pressure control valve 12. Inlet end 13 and outlet end 14 of tube 10 emerge from tank 11 through its bottom and top respectively. Lines 15 and 16 and pump 17 are provided to feed caustic soda from a supply tank thereof (not shown) to inlet end 13 of tube 10.

Leading to the eleven spirals of the coiled tube there are eleven identical feed lines 18 one for each of the spirals. Each feed line is equipped with a metering device 19 and is branched to a main chlorine distribution line 20. Each of the eleven feed lines 18 is equipped with a jet (not shown) to inject chlorine into one spiral of the tube. Eleven chlorine injection sites are thus provided and they are identified as A, B, C, D, E, F, G, H, I, J, K.

Calcium hydroxide is fed to reaction tube 10 at six injection sites A', B', D', E', F', and G', located on the same spirals as chlorine injection sites A, B, D, E, F and G through six identical feed lines 21, metering devices 22, main line 23 and pump 24.

The process of the invention was carried out using the above described apparatus. Through pump 17 and line 16 to the inlet end 13 of reaction tube 10 there was fed a 22% solution of sodium hydroxide from a supply tank thereof at such a rate that 21 pounds of 100% sodium hydroxide were introduced into the reaction tube. Once the latter was filled with the sodium hydroxide solution chlorine gas and calcium hydroxide feeding was started. Chlorine gas was fed at the rate of 60 pounds per hour through main line 20 for distribution through the eleven metering devices 19 and lines 18 to injection sites A to K. The metering devices 19 were set individually so that 8 pounds per hour were fed to each of sites A, B, C and D, 7 pounds to each of sites E and F, 5 pounds to G, 4 pounds to H, 3 pounds to I, 1.5 pounds to J and 0.5 pound to K. Simultaneously calcium hydroxide as a 33.3% aqueous slurry thereof was fed through pump 24, main line 23, the six metering devices 22 and lines 21 for introduction into the reaction tube at injection sites A', B', D', E', F', and G'. The rate of feeding of the calcium hydroxide slurry was such that 50 pounds per hour of 96% calcium hydroxide were introduced into the reaction tube. Metering devices 22 were set so that the 50 pounds of calcium hydroxide were evenly distributed between the six injection sites A', B', D', E', F' and G'. The redox potential of the reaction mixture was surveyed through several redox probes installed along the length of the tube. Typical measurements of the redox potential indicated 700 mV around injection site D', 730 mV around site G', 800 mV around site H and 900 mV at exit end 14 of tube 10. The latter measurement of 900 mV indicated that the reaction was complete and the resulting calcium hypochlorite slurry was collected from the reaction tube.

Contrarily to what is indicated in the foregoing description, no agitators such as static mixers were used in the above specific example. This is because of reduced size of the apparatus used which did not require such mixers for proper agitation.

I claim:

1. A process for the continuous preparation of calcium hypochlorite slurry which comprises:
   (a) continuously feeding an aqueous solution of sodium hydroxide to one end of a stirred tubular reactor;
   (b) at each one of a number of injection sites axially spaced along the length of the tubular reactor continuously and separately injecting chlorine and an aqueous slurry of calcium hydroxide at such rates and molar ratio to each other that the redox potential of the resulting reaction mixture at any one injection site remains constant at a value not lower than that at the immediately preceding injection site, said rates of injection and molar ratio being such at the last injection site that the redox potential of the reaction mixture at that site is in the range from 900 to 950 mV; and
   (c) removing the produced slurry of calcium hypochlorite from the other end of the tubular reactor; the temperature of the reaction mixture throughout the process being maintained within the range from 10° C. to 30° C.

2. A process as claimed in claim 1 wherein the redox potential of the reaction mixture at any one injection site is higher than that at the immediately preceding site.

3. A process as claimed in claim 1 wherein the temperature is controlled by evaporative cooling.

4. A process as claimed in claim 1 wherein there are at least ten injection sites.

* * * * *